(12) United States Patent
Eshita

(10) Patent No.: US 8,203,918 B2
(45) Date of Patent: Jun. 19, 2012

(54) MIRROR SIGNAL GENERATION CIRCUIT

(75) Inventor: Shiro Eshita, Kyoto (JP)

(73) Assignee: Rohm Co., Ltd. (JP)

( * ) Notice: Subject to any disclaimer, the term of this patent is extended or adjusted under 35 U.S.C. 154(b) by 1227 days.

(21) Appl. No.: 11/914,401

(22) PCT Filed: May 15, 2006

(86) PCT No.: PCT/JP2006/309641
§ 371 (c)(1),
(2), (4) Date: Nov. 14, 2007

(87) PCT Pub. No.: WO2006/123603
PCT Pub. Date: Nov. 23, 2006

(65) Prior Publication Data
US 2009/0092380 A1   Apr. 9, 2009

(30) Foreign Application Priority Data

May 17, 2005  (JP) .................................. 2005-144477

(51) Int. Cl.
*G11B 7/00*   (2006.01)
(52) U.S. Cl. .................................. 369/44.34; 369/53.28
(58) Field of Classification Search ........................ None
See application file for complete search history.

(56) References Cited

U.S. PATENT DOCUMENTS

2002/0141314 A1 * 10/2002 Yang .......................... 369/53.31

FOREIGN PATENT DOCUMENTS

| JP | 9-128761 A | 5/1997 |
| JP | 10-134369 A | 5/1998 |
| JP | 2001-229549 A | 8/2001 |

OTHER PUBLICATIONS

Written Opinion of the International Searching Authority for PCT/JP2006-309641; International Filing Date: May 15, 2006.
International Search Report for International Application No. PCT/JP2006/309641 mailed Aug. 15, 2006.

* cited by examiner

*Primary Examiner* — Paul Huber
(74) *Attorney, Agent, or Firm* — Cantor Colburn LLP

(57) ABSTRACT

A low pass filter unit generates a slice level for digitizing the signal based on the track state from the signal. When a tracking servo is in invalid state, a sample hold unit holds a slice level sampled at a predetermined timing. A comparison unit compares the signal based on the track state to the slice level and generates a mirror signal. When the tracking servo becomes in an invalid from valid state, the low pass filter unit uses the slice level held in the sample hold unit.

10 Claims, 4 Drawing Sheets

MIRROR SIGNAL GENERATION CIRCUIT

CROSS REFERENCE TO RELATED APPLICATIONS

This is a U.S. national stage of application No. PCT/JP2006/309641, filed on 15 May 2006. Priority under 35 U.S.C. §119(a) and 35 U.S.C. §365(b) is claimed from Japanese Application No. 2005-144477, filed 17 May 2005, the disclosure of which is also incorporated herein by reference.

BACKGROUND OF THE INVENTION

1. Field of the Invention

The present invention relates to a mirror signal generation method for generating a mirror signal from a disc read signal and the like, a mirror signal generation circuit, and an optical disc device using the same.

2. Description of the Related Art

Optical discs of various standards such as CD-R/RW, DVD-R/RW, Blue ray, and the like are being widely used. In such optical disc device, tracking error signal and mirror signal are known as signals indicating the moving distance and the moving direction when performing the pickup movement such as track jump and seek operation. The mirror signal is a signal obtained by comparing and digitizing the signal indicating on-track/off-track at a predetermined slice level. An RF ripple signal (hereinafter appropriately expressed as RFRP signal) and the like having an amplitude magnitude of the disc read signal (hereinafter appropriately expressed as RF signal in the present specification) can be used as the signal indicating the on-track/off-track state.

A patent document 1 shows a general mirror signal detection circuit. In the configuration of FIG. 11 of the patent document 1, two peak bottom hold circuits having different droop rates are arranged, where an envelope difference signal of the RF signal is retrieved at the first stage and peak bottom hold is performed at the second stage. In this method, the level of the peak hold and the bottom hold are added and divided by 2 to generate a slice level of the envelope difference signal.

Various methods such as method of changing the addition ratio of the peak bottom hold level of the second stage, devising a constant to be multiplied after the addition etc. are being reviewed regarding the slice level generation method, but in either method, the slice level is generated with the peak bottom hold level of the second stage as a reference.
[Patent document 1] Japanese Patent Application (Laid Open) No. 9-128761

If noise is mixed in the RF signal or the amplitude level is suddenly changed, the slice level does not stabilize and a correct mirror signal cannot be obtained with the above method.

SUMMARY OF THE INVENTION

The present invention has been made in view of the above situation, a general purpose of the present invention is to generate a stable mirror signal.

A mirror signal generation method according to one embodiment of the present invention relates to a method for generating a mirror signal from a signal based on a track state of an optical disc; wherein a slice level for digitizing the signal based on the track state of when a tracking servo becomes in invalid state from valid state is generated using a slice level sampled and held at a predetermined timing when the tracking servo is in invalid state at the previous time. "Signal based on the track state of the optical disc" may be a RF ripple signal of the optical disc, or may be a track cross signal.

According to such embodiment, a stable slice level can be generated even when the tracking servo becomes in invalid state from valid state by using the slice level sampled at a predetermined timing when the tracking servo is in invalid state at the previous time.

The slice level of when the tracking servo becomes in invalid state from valid state may be generated using a slice level sampled at a timing the tracking servo becomes in valid state from invalid state at the previous time. According to such embodiment, the next invalid period of the tracking servo starts from a stable slice level by using the slice level sampled at a timing it becomes in valid state from invalid state.

A mirror signal generation circuit according to another embodiment of the present invention relates to a circuit for generating a mirror signal from a signal based on a track state of an optical disc; the circuit including a slice level generation unit which generates a slice level for digitizing a signal based on the track state from the signal; a sample hold unit which holds the slice level sampled at a predetermined timing when the tracking servo is in invalid state; and a comparison unit which compares the signal based on the track state to the slice level and generates a mirror signal. The slice level generation unit uses the slice level held in the sample hold unit when the tracking servo becomes in invalid state from valid state.

According to such embodiment, a stable slice level can be generated even when the tracking servo becomes in an invalid from valid state by using the slice level held in the sample hold unit which has been sampled when the tracking servo is in invalid state at the previous time.

A control signal generation unit which generates a control signal for providing timing to sample the slice level to the sample hold unit may be further arranged. The control signal generation unit provides the timing when the tracking servo becomes in valid state from invalid state to the sample hold unit. According to such embodiment, the slice level can be sampled at the timing the sample hold unit becomes in valid state from invalid state, and the next invalid period of the tracking servo can start at the stable slice level using such slice level.

The control signal generation unit generates a control signal instructing to use the slice level generated by the slice level generation unit when the tracking servo is in invalid state and to use the slice level held in the sample hold unit when the tracking servo is in valid state.

The control signal generation unit may include a measuring unit which measures a period from a significant signal level to an insignificant signal level of the mirror signal or a signal generated in an optical disc device having substantially the same frequency as the mirror signal. It may generate a control signal to instruct, when a measurement result by the measuring unit exceeds a predetermined set value, the slice level to be sampled and held.

According to such embodiment, the slice level is prevented from being sampled and held at a level deviated towards high level or low level side.

The slice level generation unit includes a low pass filter for extracting low frequency components of the signal based on the track state, the output signal of the low pass filter may be the slice level. According to such embodiment, a slice level generation unit having strong resistance to noise can be realized.

The processes of the slice level generation unit and the sample hold unit are performed through digital signal processing using a processor. According to such embodiment, the slice level can be generated at satisfactory precision by using the digital signal processing. For instance, the droop rate can be set to a desired value. Furthermore, the circuit scale can be reduced.

An optical disc device according to still another embodiment of the present invention relates to an optical disc device including an optical pickup; and the mirror signal generation circuit for generating a mirror signal from a signal based on a track state of an optical disc received from the optical pickup. According to such embodiment, an optical disc device capable of generating a stable mirror signal can be realized.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
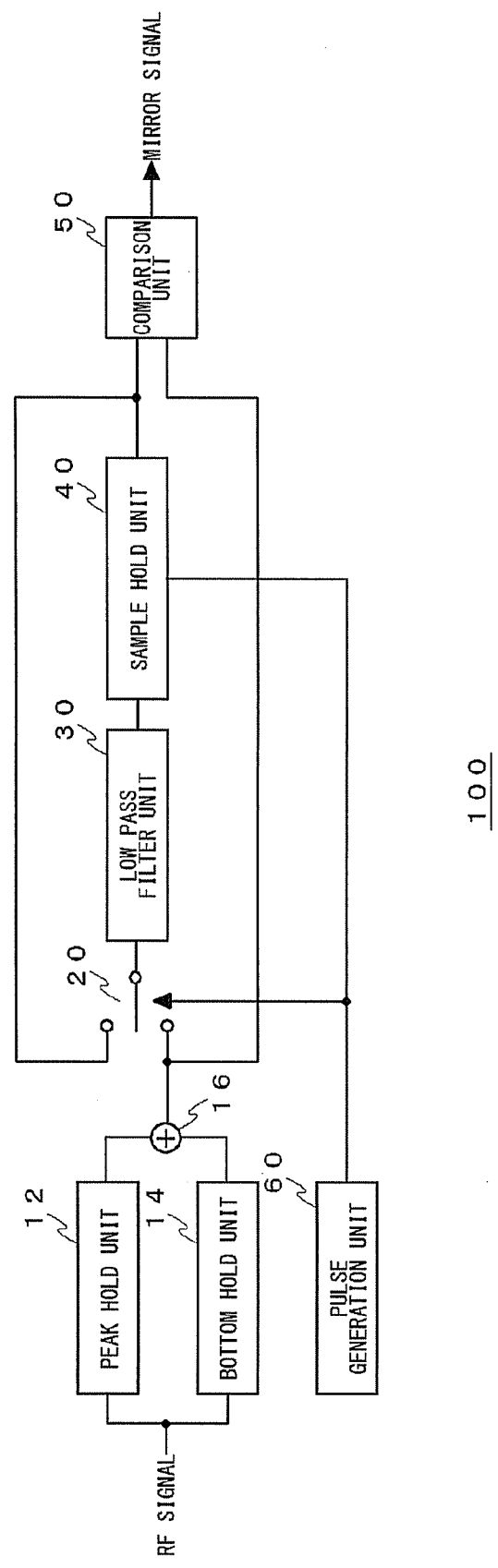
FIG. 1 is a view showing a configuration of a mirror signal generation circuit according to an embodiment of the present invention.

The present invention is realized with a circuit configuration as described below to generate an optimum slice level for mirror signal generation and obtain a stable mirror signal. FIG. 1 shows a configuration of a mirror signal generation circuit 100 according to an embodiment of the present invention. The configuration of the mirror signal generation circuit 100 is mainly drawn with functional blocks realized by cooperation of hardware elements and software elements. The functional blocks are realized by a microprocessor such as an arbitrary analog front end processor and DSP (Digital Signal Processor), memory, and analog circuit element such as operational amplifier and capacitor, and the like for hardware and realized by program and the like loaded in the memory for software. Therefore, it should be apparent to those skilled in the art that the functional blocks can be realized in various forms only with hardware, only with software, or a combination thereof.

The mirror signal generation 100 includes a peak hold unit 12, a bottom hold unit 14, a subtraction unit 16, a switch 20, a low pass filter unit 30, a sample hold unit 40, a comparison unit 50, and a pulse generation unit 60. The peak hold unit 12, the bottom hold unit 14, and the subtraction unit 16 are elements for generating the RFRP signal. The RF signal generated based on the signal read from the disc by an optical pickup (not shown) is input to the peak hold unit 12 and the bottom hold unit 14.

The peak hold unit 12 sequentially holds the peak value of the input RF signal, and generates an upper envelope signal. The bottom hold unit 14 sequentially holds the bottom value of the input RF signal, and generates a lower envelope signal. The subtraction unit 16 subtracts the level of the lower envelope signal input from the bottom hold unit 14 from the level of the upper envelope signal input from the peak hold unit 12, and generates the RFRP signal. The RFRP signal is input to the comparison unit 50. The signal is also input to the low pass filter unit 30 via the switch 20.

The switch 20, the low pass filter unit 30, and the sample hold unit 40 are elements for generating a slice level signal to digitize the RFRP signal in the comparison unit 50. The switch 20 selects either the RFRP signal or the signal fed back from the sample hold unit 40, and outputs the same to the low pass filter unit 30. The low pass filter unit 30 passes only the frequency components of lower than or equal to a predetermined cutoff frequency of the input signal. The low pass filter unit 30 may be configured with a digital filter, or may be configured with an analog filter. If configured with the digital filter, the droop rate may be set to zero.

The sample hold unit 40 samples the output signal of the low pass filter unit 30 at a predetermined timing and holds the same for a predetermined period. The sampling timing and the holding period are controlled by a pulse signal generated by the pulse generation unit 60. The sample hold unit 40 provides the holding signal to the comparison unit 50 as the slice level signal. The held signal is also fed back to the low pass filter unit 30 via the switch 20. Therefore, the low pass filter unit 30 can hold the value of the sample hold unit 40 during a period the RFRP signal is not input, and when switched so that the RFRP signal is input, the filtering of the RFRP signal can start from a state of holding the relevant value.

The comparison unit 50 compares the input RFRP signal and the input slice level signal, and outputs a high level signal or a low level signal according to the comparison result. For instance, the high level signal may be output if the RFRP signal exceeds the slice level signal, and the low level signal may be output if the RFRP signal is lower than or equal to the slice level. The output signal of the comparison unit 50 that is digitized becomes the mirror signal.

The pulse generation unit 60 generates the pulse signal for controlling the switch 20 and the sample hold unit 40. For instance, The low level signal is generated when the tracking loop for validating the tracking servo of the optical pickup is in the closed state and the high level signal is generated when in the opened state. In this case, the switch 20 receives the pulse signal, the path to which the RFRP signal is input is selected in the case of high level signal, and the path to which the feed back signal from the sample hold unit 40 is input is selected in the case of low level signal. In the case of high level signal, the sample hold unit 40 may stop the function and sample the output signal of the low pass filter unit 30 at the falling edge from the high level signal to the low level signal. The sampled value is held during the period of the low level signal.

Figure 2:
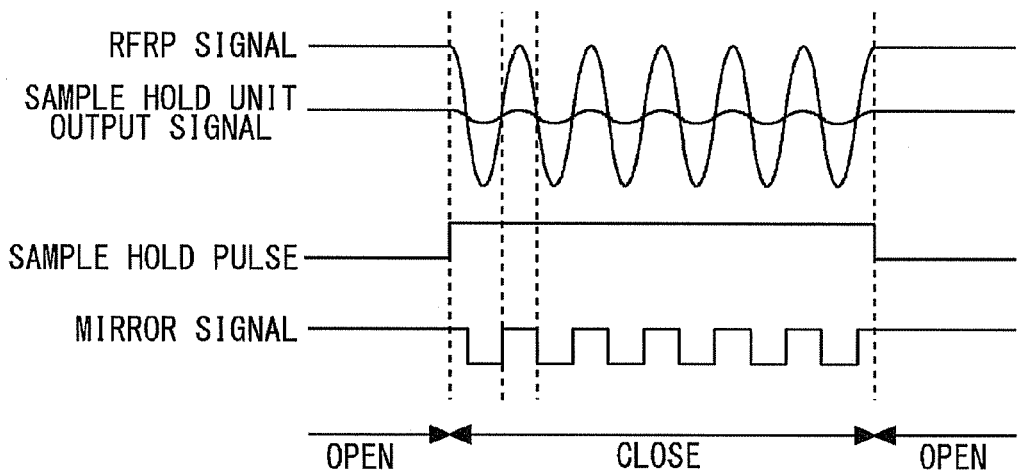
FIG. 2 is a view showing a waveform transition of each signal generated in the mirror signal generation circuit according to the embodiment.

The state of the mirror signal generation by the mirror signal generation circuit 100 according to the embodiment will now be shown. FIG. 2 shows a waveform transition of each signal generated in the mirror signal generation circuit 100 of the embodiment. The mirror signal is required mainly when switching from the closed state of the tracking loop to the opened state thereof as in time of track jump.

FIG. 2 shows a case in which the tracking loop for validating the tracking servo changes from the closed state to the opened state and from the opened state to the closed state. The waveform of the RFRP signal fluctuates as in the figure since the lens crosses the track due to decentering of the disc, lens displacement, and like before the RF signal reproduction and in the tracking loop opened state such as track jump or during seek. The on-track state is maintained in the tracking loop closed state, and thus the waveform level stabilizes. During the on-track, transition occurs at a relatively high level since the amplitude of the RF signal is large.

Such RFRP signal is digitized at the slice level, which is the output signal of the low pass filter unit 30. The output signal of the low pass filter unit 30 is held in the sample hold unit 40 in the tracking loop closed state, and the slice level is maintained at a constant level. In the tracking loop closed state, the RFRP signal is input to the low pass filter unit 30. When transitioning from the tracking loop closed state to the opened state, the change in waveform starts from the slice level held in the closed state, and thus a transition period of transitioning to the stable level is not provided and the slice level immediately transitions within the stable range. Therefore, the stable slice level is constantly maintained, and the mirror signal digitized by using such slice level stabilized is also.

Figure 3:
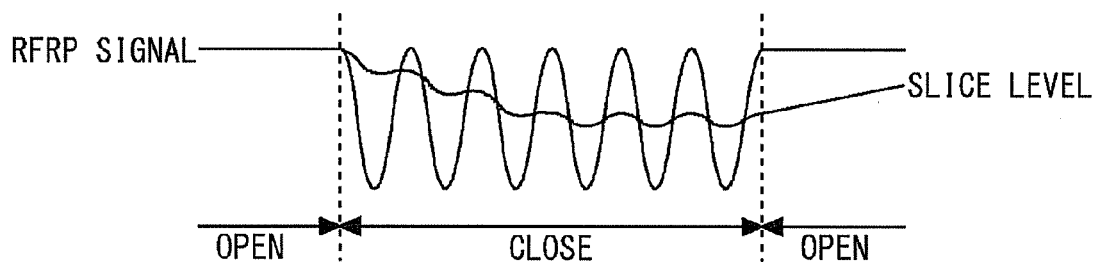
FIG. 3 is a view showing a transition of the slice level when the sample hold unit is not used.

FIG. 3 shows a transition of the slice level when the sample hold unit is not used. If the slice level is generated from the RFRP signal whether in the tracking loop opened state or in the closed state, it is apparent from the figure that a correct slice level cannot be obtained when the tracking loop changes from the closed state to the opened state. That is, stabilization to a correct slice level requires time due to the integration effect of the low pass filter.

Figure 4:
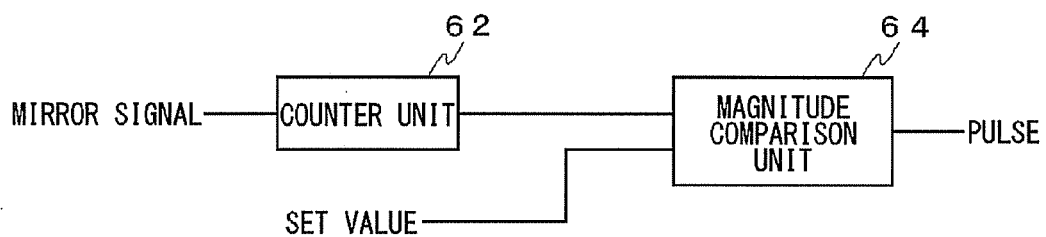
FIG. 4 is a view showing a configuration example of a pulse generation unit.

FIG. 4 shows a configuration example of the pulse generation unit 60. In the above description, an example in which the pulse generation unit 60 generates a pulse that takes the high level to control so that the slice level is held in the tracking loop closed state, and takes the low level to control so that the RFRP signal is sampled in the tracking loop opened state has been described. FIG. 5 shows a waveform transition of when a period in which the level of the RFRP signal is low continues for greater than or equal to a constant period immediately before changing from the tracking loop opened state to the tracking loop closed state.

Figure 5A:
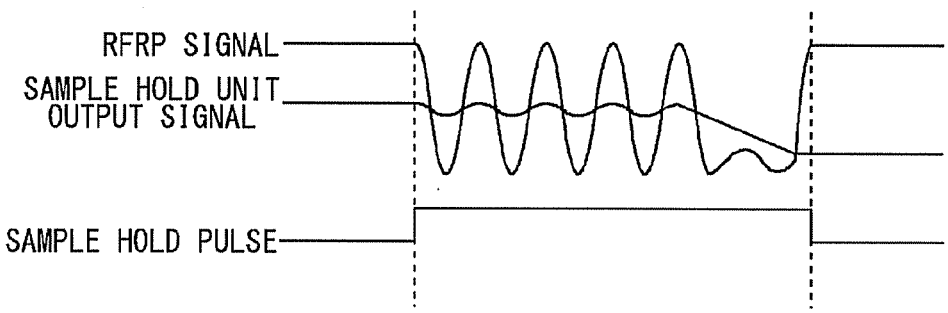
FIG. 5 is a view showing a waveform transition of when a period in which the level of the RFRP signal is low continues for greater than or equal to a constant period immediately before changing from a tracking loop opened state to a tracking loop closed state.

FIG. 5A shows a waveform transition of when the open/close state of the tracking loop and the sample hold pulse are synchronized as in the example described above. As shown in the figure, the slice level deviates if the time in which the level of the RFRP signal is low continues for a long time. Such state is a phenomenon frequently seen in time of termination of track jump and the like. If the tracking loop changes from the opened state to the closed state when the slice level deviates and lowers, the low slice level is held in the sample hold unit 40.

The configuration example of FIG. 4 is a configuration capable of maintaining a stable slice level even with respect to such state. In FIG. 4, the pulse generation unit 60 includes a counter unit 62 and a magnitude comparison unit 64. The counter unit 62 measures the fluctuation time of the input mirror signal, that is, time from low level to high level or from high level to low level. The counter unit 62 may be configured with an interval counter. Generally, such counter is required for speed control of the track jump, and thus is often arranged in the optical disc device to serve as a function of the servo processor.

The magnitude comparison unit 64 compares the value counted by the counter unit 62 and a predetermined set value set in advance, and outputs the magnitude relation as the sample hold pulse. The predetermined set value is a value for judging whether or not deviation by which the output signal of the low pass filter unit 30 cannot be accepted in the high level or the low level direction by the time constant occurs if sampling is further continued. This value may be obtained through experiment or simulation.

The magnitude comparison unit 46 outputs the sample hold pulse of low level when the count value of the counter unit 62 is larger than the predetermined set value to hold the slice level at the time. Thus when the speed of the mirror signal becomes slow, the low pass filter unit 30 automatically becomes the hold state and holds the stable slice level. When referring to the speed of the mirror signal being slow, it means that the fluctuation interval of the mirror signal is long and the frequency is low. The logical product of the pulse that is at high level in the tracking loop closed state and at low level in the tracking loop opened state, and the output pulse of the magnitude comparison unit 64 may be obtained.

Figure 5B:
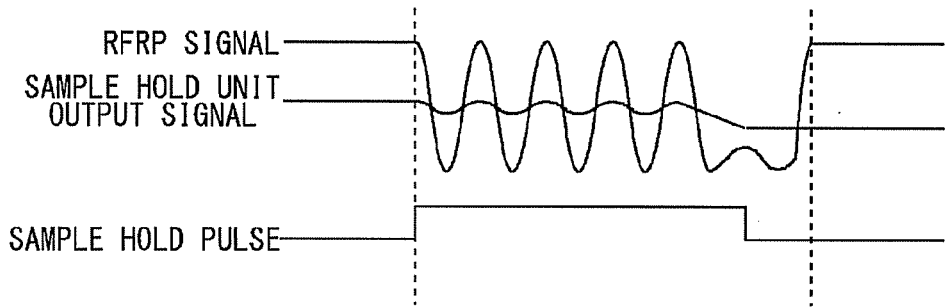

FIG. 5B shows a waveform transition of when controlled by the pulse generation unit 60 having a configuration of FIG. 4. Immediately before changing from the tracking loop opened state to the tracking loop closed state, the sample hold pulse is inverted before the slice level greatly deviates in the low level direction even if the period in which the level of the RFRP signal is low continues for greater than or equal to a constant period, and thus a slice level having small deviation can be maintained.

An example of using the RFRP signal to generate the mirror signal has been described in the above description. In this regards, if there are other available signals in the optical disc device, such signals may be used. For instance, a track cross signal may be used. The track cross signal refers to a track crossing signal that becomes a maximum on the track and becomes a minimum in the middle between the tracks.

Figure 6:
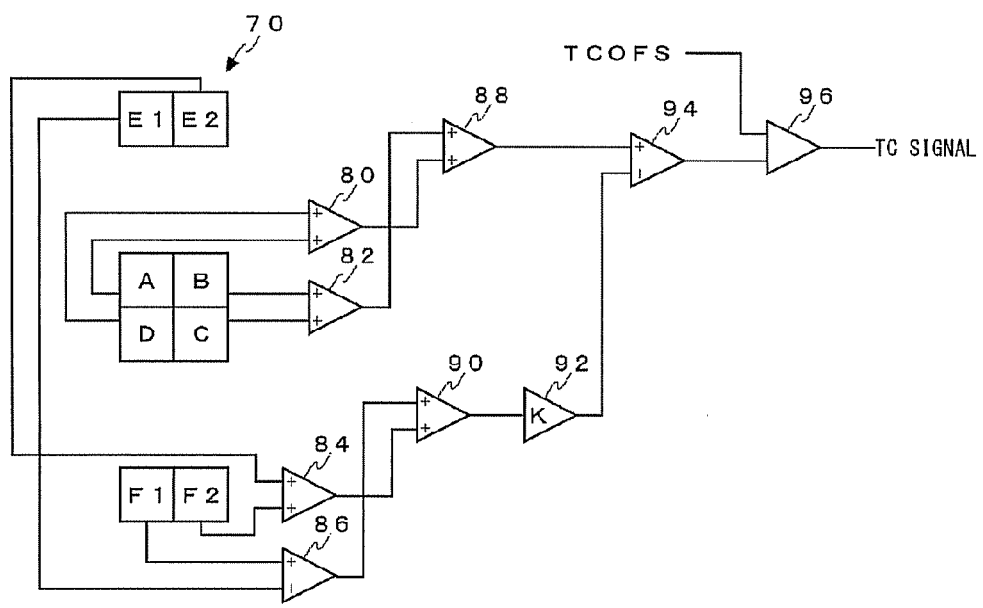
FIG. 6 is a view showing a configuration example of a track cross signal generation unit.

FIG. 6 shows a configuration example of a track cross signal generation unit 18. A light receiving element 70 includes light receiving regions A, B, C, D divided into four for light-receiving the reflected light components related to the main beam M, light receiving regions E1, E2 divided in two in the tracking direction for light-receiving the reflected light components related to one of the sub-beams, and light receiving regions F1, F2 divided in two in the tracking direction for light-receiving the reflected light components related to the other sub-beams.

The track cross signal TC obtained from the light receiving element 70 is expressed as, $$TC=\{(A+D)+(B+C)\}-K^*\{(E1+F1)+(E2+F2)\} \quad \text{(Eq. 1)}$$

The track cross signal TC is used for counting the track crossing numbers in time of high speed seek of the optical pickup, for tracking servo drawing in time of seek using the feature that the phase difference between the track cross signal TC and the track error signal is 90°, and the like. The value of a constant K in equation 1 represents the gain ratio of the main beam and the sub-beam, where the offset of the track cross signal TC is removed by setting the K value to an appropriate value.

In order to achieve equation 2, a first summing amplifier 80, a second summing amplifier 82, a third summing amplifier 84, and a fourth summing amplifier 86 are arranged, each of which performs the addition process of (A+D), (B+C), (E1+F1) and (E2+F2). A fifth summing amplifier 88 and a sixth summing amplifier 90 for performing the addition process of {(A+D)+(B+C)} and {(E1+F1)+(E2+F2)} based on the computation result of the summing amplifiers 80 to 86 are arranged. A gain adjustment amplifier 92 in which the gain is set to K is arranged on the output side of the sixth summing amplifier. Finally, an operation amplifier 94 for executing (eq. 1) is arranged. A gain variable amplifier 96 for removing the influence of stray light, and the like may be arranged. In this case, the predetermined offset amount TCOFS is input to the gain variable amplifier 96.

The track cross signal generation unit 18 can be connected to the low pass filter unit 30 and the comparison unit 50 in place of the peak hold unit 12, the bottom hold unit 14, and the subtraction unit 16 shown in FIG. 1. That is, the track cross signal is input to the low pass filter unit 30 and the comparison unit 50 instead of the RFRP signal.

Such method is effective only in the pickup method using the main beam and the sub-beam, but may be used as a method of generating the mirror signal when RF signal cannot be generated in non-recorded media such as CD-R and DVD±R.

According to the present embodiment, since the output signal of the low pass filter is used to generate the slice level of the RFRP signal and the track cross signal, a stable mirror signal having resistance to noise and amplitude fluctuation can be obtained compared to a method of using the peak bottom hold circuit, as described above. Furthermore, a small-scale simple configuration is realized as it is configured by the low pass filter and the sample hold circuit. Furthermore, if realized with the DSP, the configuration becomes smaller and the level is digitally held, whereby the droop of the hold of the slice level can be made to zero.

When the fluctuation interval of the mirror signal is measured and is longer than a predetermined interval, a function of holding the sample hold circuit can be provided, in which case, the slice level is prevented from deviating to either the high level or the low level, and a stable mirror signal can be obtained.

Figure 7:
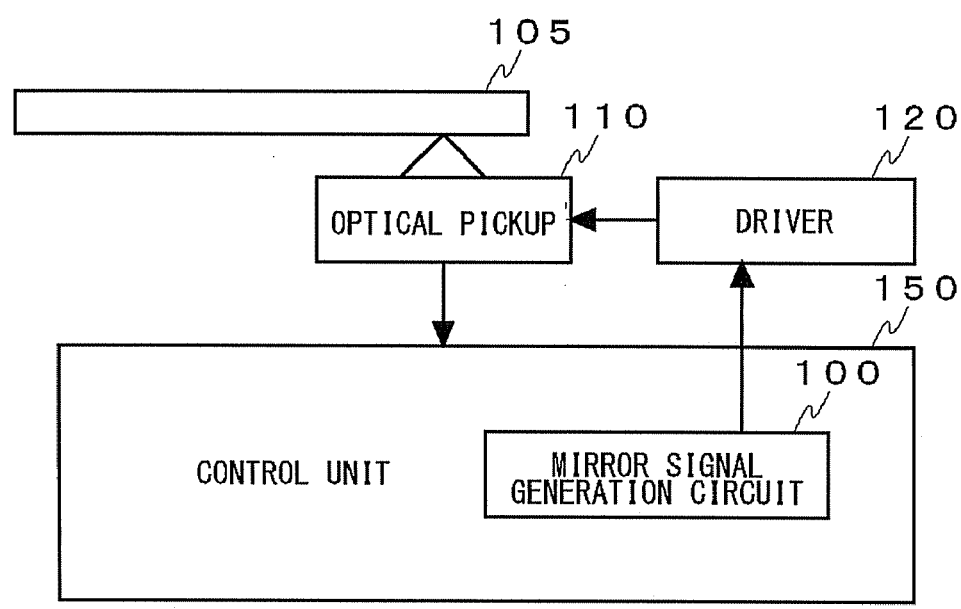
FIG. 7 is a view showing a configuration of an optical disc device mounted with the mirror signal generation circuit according to the present embodiment.

An optical disc device 200 mounted with the mirror signal generation circuit 10 described in the above embodiment will now be described. FIG. 7 shows a configuration of the optical disc device 200 mounted with the mirror signal generation circuit 100 according to the present embodiment. The optical pickup 110 irradiates laser on the optical disc 105, and receives the reflected light. A control unit 150 controls the entire optical disc device 200. The mirror signal generation circuit 100 according to the present embodiment is mounted in the control unit 150. The driver 120 drives the optical pickup 110 according to the command of the control unit 150. In the present embodiment, the movement of the optical pickup 110 such as track jump is controlled according to the mirror signal generated in the mirror signal generation circuit 100. According to the present embodiment, the optical disc device exerting effects similar to the mirror signal generation circuit described above is achieved, as described above.

The present invention has been described based on the embodiment. It should be apparent to those skilled in the art that the embodiment is for illustrative purposes only, and various variants can be made for combinations of each component and each processing process, and that such variants are also enclosed in the scope of the present invention.

For instance, in FIG. 4, the mirror signal is input to the counter unit 62. In this regards, the tracking error signal or the track cross signal may be input instead of the mirror signal. The tracking error signal and the track cross signal have different phase from the mirror signal but have the same frequency as the mirror signal in the optical disc system, and thus similar effects can be obtained.

The present invention is also applicable to a configuration of generating the slice level in the general peak bottom circuit of adding the level of the peak hold and the bottom hold and dividing by 2 in place of the low pass filter unit 30 of FIG. 1. In this case as well, when changing from the tracking loop closed state to the opened state, the unstable movement of the slice level by such change can be suppressed.

The invention claimed is:

1. A method for generating a mirror signal from a signal based on a track state of an optical disc, wherein
a slice level for digitizing the signal based on the track state of when a tracking servo becomes in invalid state from valid state is generated using a slice level sampled and held at a predetermined timing when the tracking servo is in invalid state at the previous time.

2. The mirror signal generation method according to claim 1, wherein
the slice level of when the tracking servo becomes in invalid state from valid state is generated using a slice level sampled at a timing the tracking servo becomes in valid state from invalid state at the previous time.

3. A circuit for generating a mirror signal from a signal based on a track state of an optical disc; the circuit comprising:
a slice level generation unit which generates a slice level for digitizing a signal based on the track state from the signal;
a sample hold unit which holds the slice level sampled at a predetermined timing when the tracking servo is in invalid state; and
a comparison unit which compares the signal based on the track state to the slice level and generates a mirror signal; wherein
the slice level generation unit uses the slice level held in the sample hold unit when the tracking servo becomes in invalid state from valid state.

4. The mirror signal generation circuit according to claim 3, further comprising:
a control signal generation unit which generates a control signal for providing a timing to sample the slice level to the sample hold unit; wherein
the control signal generation unit provides the timing when the tracking servo becomes in valid state from invalid state to the sample hold unit.

5. The mirror signal generation unit according to claim 4, wherein
the control signal generation unit generates a control signal instructing to use the slice level generated by the slice level generation unit when the tracking servo is in invalid state and to use the slice level held in the sample hold unit when the tracking servo is in valid state.

6. The mirror signal generation circuit according to claim 4, wherein
the control signal generation unit includes a measuring unit which measures a period from a significant signal level to an insignificant signal level of the mirror signal or a signal generated in an optical disc device having substantially the same frequency as the mirror signal; and the control signal generation unit generates a control signal to instruct, when a measurement result by the measuring unit exceeds a predetermined set value, the slice level to be sampled and held.

7. The mirror signal generation circuit according to claim 3, wherein the slice level generation unit includes a low pass filter for extracting low frequency components of the signal based on the track state, the output signal of the low pass filter being the slice level.

8. The mirror signal generation circuit according to claim 3, wherein processes of the slice level generation unit and the sample hold unit are performed through digital signal processing using a processor.

9. The mirror signal generation circuit according to claim 3, the circuit being integrated on a same semiconductor substrate.

10. An optical disc device comprising:
an optical pickup; and
the mirror signal generation circuit according to claim 3 for generating a mirror signal from a signal based on a track state of an optical disc received from the optical pickup.

* * * * *